Sept. 15, 1953  W. H. WARSTLER  2,651,985
VALVE
Original Filed Nov. 19, 1945
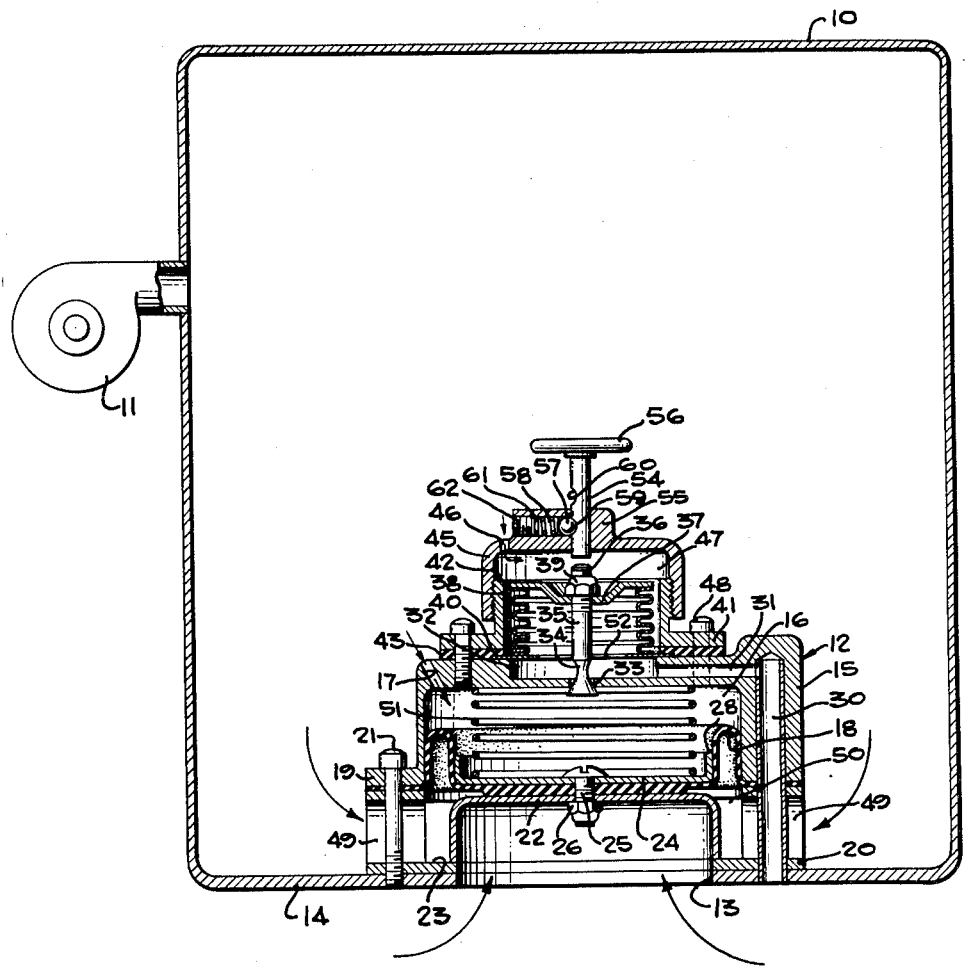
WALTER HERMAN WARSTLER,
INVENTOR.
BY
ATTORNEY Patented Sept. 15, 1953

2,651,985

UNITED STATES PATENT OFFICE 2,651,985

VALVE

Walter Herman Warstler, Los Angeles, Calif., assignor to The Garrett Corporation, Los Angeles, Calif., a corporation of California Continuation of application Serial No. 629,432, November 19, 1945. This application July 17, 1952, Serial No. 299,481

3 Claims. (Cl. 98—1.5)

This invention relates generally to pressure control means, and more particularly to apparatus for controlling the fluid pressure within an enclosure at a predetermined or preselected relationship to that of the ambient fluid pressure, that is, to the maintaining of a predetermined pressure differential between the fluid pressure inside and outside said enclosure. This application is a continuation of applicant's copending application for Valves, Serial No. 629,432 filed November 19, 1945, now abandoned.

In its broader aspects, the invention has utility wherever there is a chamber wherein it is desired to maintain a pressure differential between the inside and outside thereof. The present use for the invention is in connection with a pressurized aircraft cabin, and as an example of the utility of the invention it is illustrated and described in connection with a pressurized aircraft cabin.

At the present time it is common practice to pressurize aircraft cabins, there being various means for so doing and for controlling the cabin air pressure relative to ambient air pressure, one such means being disclosed in the United States reissue patent to Price, No. Re. 22,272, issued February 16, 1943.

In present-day pressurized aircraft cabins the cabin is generally supplied with air under pressure by suitable means such as a supercharger. Further, various pressure conditions are encountered due to changes in altitude of the aircraft, so that the differential of air pressures between the inside and the outside of the cabin may vary considerably, and it is desirable, both with respect to the physical well being of the occupants of the cabin and with respect to the structural integrity of the airplane cabin, to prevent such pressure differentials from exceeding a predetermined value, dependent upon the above factors.

It is therefore an object of the present invention to provide a reliable device of simple construction which will prevent the pressure differential between the inside and outside of the cabin from exceeding a predetermined or preselected value.

In devices of the present character it is highly desirable for the device to operate automatically, and it is therefore another object of the present invention to provide a device which will operate automatically, such automatic operation being effected by means responsive to the differences of pressure inside and outside the aircraft.

It is also desirable, in controlling the pressure within the cabin, to have an arrangement whereby there may be two-way flow, that is, a flow from the interior of the cabin to atmosphere, or a flow from atmosphere into the cabin, and it is another object of the present invention to provide a device which will thus control the flow of air under preselected pressure conditions. For example, if the pressure differential between the inside of the cabin and the ambient air exceeds said predetermined pressure differential, with the pressure inside the cabin higher than the ambient atmospheric air pressure, the valve will open and permit escape of air from the cabin. On the other hand, if the ambient air pressure is higher than cabin pressure, the valve will also open, and admit atmospheric air into said cabin.

The present invention may be used as the sole means for controlling the differential of pressure between the inside of the cabin and the ambient air, or it may be used as an auxiliary device in connection with some other pressurizing system. In the latter event, should the regular pressurizing system fail to operate properly, the present device will insure the maintenance of the proper pressure within the cabin with respect to ambient pressure.

It may also be desirable in a device of the present character, to provide means for manually overriding the automatic control means in the event of failure of the latter, or should the pilot become aware of impending trouble with said means. It is, therefore, another object of the present invention to provide a manual control which, as herein illustrated, is adapted to cause the valve to function to maintain the pressure within and without the cabin at substantially the same value.

Further objects and advantages of the invention will appear in the following part of the specification.

Referring to the drawing, which is for illustrative purposes only, there is diagrammatically shown a pressurized aircraft cabin having pressure control means embodying the present invention, and an enclosure 10, which may be taken as representative of an aircraft cabin or the like, is supplied with air under pressure by suitable means which, as shown, is a supercharger 11 given by any suitable source of power, not shown. Means for controlling the pressure differential between the interior of the cabin and the pressure of ambient air is shown as including a movable member such as a valve, indicated generally at 12, controlling an opening 13 in a wall 14 of the enclosure 10, said opening 13 comprising a connection between the enclosure and atmosphere. The valve comprises a body section 15 having an interior chamber 16 opening downwardly and connected to the cabin by a restricted opening 17. Chamber 16 has its open end closed by a diaphragm 18 marginally clamped between a flange 19 to the body section 15 and an annular supporting section 20. Screws 21 may be employed for securing the parts together and for securing the valve 12 to the wall 14.

Means for controlling the opening 13 is shown as an inverted cup-shaped member 22, the rim of which is adapted to seat on an annular inwardly extending flange or valve seat 23 of the supporting section 20. The bottom wall of the valve member 22 is secured to the diaphragm 18, there being a plate 24 on the side of the diaphragm opposite the valve 22, and the parts are secured together by a bolt 25 having a nut 26 on its threaded depending end. It is to be noted that the adjacent edge of the valve member 22 is rounded away from the diaphragm and that the plate 24 has a marginal portion 28 turned away from the diaphragm. This arrangement reinforces the central portion of the diaphragm and also prevents cutting, or otherwise injuring same, by the edges of the valve member and plate.

Means for communicating atmospheric or ambient air pressure to the chamber 16 is shown as a passage 30 extending from the exterior of the cabin or enclosure through the supporting section 20, adjacent the marginal edge of the diaphragm 18 and partially through the body member 15. A cross passage 31 connects the passage 30 with a chamber 32 formed in the wall of the body 15, and a port 33 in the bottom wall of chamber 32 connects said chamber 32 with said chamber 16.

Means for controlling the port 33 comprises a valve 34 having a stem 35 provided with a threaded end 36 threadably received in an opening provided therefor in a plate 37 of a pressure responsive device, indicated generally at 38 and herein shown as a "Sylphon" or bellows. A nut 39 on the end 36 of said valve stem provides means for locking the valve in any desired adjusted position. The end of the bellows 38 opposite the plate 37 is provided with a base plate 40 which extends outwardly of the circumference of the bellows and is clamped between the upper wall of the body 30 and an outwardly extending flange 41 of a tubular housing member 42, a gasket 43 being provided between the body member 15 and the flange 41 and plate 40 to prevent leakage of air between the parts. The housing member 42 is provided with external threads adjacent its upper end, as shown in the drawing, which threadably engages the internal threads of a cup-shaped housing member 45 which has a vent 46 whereby the chamber 47, formed by the housing members 42 and 45, is freely vented to the pressure within the enclosure or cabin 10. Means for securing the housing for the bellows to the body 15 comprises screws 48, although other suitable means of attachment may be employed.

Means for subjecting a portion of the side of the diaphragm 18, opposite the chamber 16, to cabin pressure comprises passages or ports 49 in the supporting member 20, which passages communicate with an annular chamber 50 formed between the adjacent portion of the diaphragm, the interior wall of the member 20 and the adjacent portion of the valve member 22, and a relatively light spring 51, coacting between the bottom wall of chamber 16 and the plate 24, provides yielding means for urging the valve member in the closing direction.

The plate 40 is provided with an opening 52 to permit communication between the chamber 32 and the interior of the bellows 38, thus subjecting the interior of the bellows to ambient air pressure. As the exterior of the bellows is subjected to cabin pressure, and the bellows is calibrated to require a predetermined pressure differential between the interior and exterior thereof to actuate same, it will be apparent that whenever the differential between the cabin and atmospheric pressures is less than the predetermined or preselected value, the bellows 38 will remain extended and will keep the valve 34 closed. Whenever the differential between the cabin and atmospheric pressure exceeds the preselected value, the bellows 38 will collapse, thus opening valve 34 and connecting the chamber 16 with atmosphere through the unrestricted passages 30 and 31, chamber 32, and opening 33. Upon opening of the valve 34 the pressure in chamber 16 tends to become that of the ambient pressure, and the cabin pressure, which is greater than ambient pressure, will act on the diaphragm 18 and urge the valve member 22 in the opening direction, thus permitting escape of air from the cabin through passages 49, chamber 50, and opening 13. The result will be a reduction in cabin pressure until the differential between the exterior and interior of the bellows 38 reaches the preselected or predetermined value, whereupon the valve 34 will be closed, and cabin pressure will build up within the chamber 16 to effect closing of the valve 22 in cooperation with the spring 51.

Whenever atmospheric pressure exceeds cabin pressure, the differential pressure across the diaphragm 18 exerts a force which will effect opening of the valve 22 and allow atmospheric air to enter the cabin.

If desired, means other than the bellows 38 may be provided for opening the valve 34. As shown, this means comprises a manually actuated plunger 54 slidable in a boss 55 formed integral with the upper wall or bottom of the housing member 45. The plunger is provided with a flange 56 adjacent its free end, and the inner end of said plunger is normally spaced from the adjacent end of the valve stem 35 to permit free actuation of the valve by the bellows 38. By pressing the plunger inwardly the inner end thereof will engage the adjacent end of the valve stem and effect opening of the valve 34. Means for latching the plunger in its uppermost position and in the valve opening position, may be provided, and, as shown, comprises a ball 57 received in a bore 58 of the boss 55. The ball is adapted to engage notches 59 and 60 in the plunger, and is urged toward the plunger by a spring 61 secured in the bore by a threaded screw plug 62. This manual control for the valve 34 may be used whenever it is found desirable to override the automatic control of the valve. This may be done, for example, in the event of failure of the automatic control means, or should the pilot become aware of impending trouble with said means.

I claim:

1. In a device for controlling the pressure within an enclosure having a connection with atmosphere: means defining a valve port communicating with said connection; a valve seat for said valve port; movable pressure sensitive control means, including a flexible diaphragm and a cup-shaped valve member attached to the central portion of said diaphragm and extending toward and having the rim thereof cooperating with said valve seat for controlling the flow of fluid through said port; walls, including said diaphragm, defining a chamber having a restricted inlet connection with the enclosure, said pressure sensitive control means being subjected on one side to chamber pressure and the annular portion on the opposite side outwardly of said valve member being subjected to enclosure pressure, the interior of said cup-shaped valve member being subjected to ambient atmospheric pressure; a passage adapted to connect the chamber with ambient atmosphere; a pilot valve controlling said passage; a bellows for controlling said pilot valve, the interior of said bellows being adapted to be connected to atmosphere and the exterior thereof being adapted to be subjected to enclosure pressure, said bellows being so calibrated as to collapse and open the pilot valve when the differential of pressure between that in the enclosure and ambient atmosphere exceeds a predetermined value; and yielding means urging the valve member in the closing direction.

2. In a device for controlling the pressure within an enclosure having a connection with atmosphere: means defining a valve port communicating with said connection; a valve seat for said valve port; movable pressure sensitive control means, including a flexible diaphragm and a cup-shaped valve member attached to the central portion of said diaphragm, said valve member extending toward and cooperating with said valve seat for controlling the flow of fluid through said port; walls, including said diaphragm, defining a chamber having a restricted inlet connection with the enclosure; said pressure sensitive control means being subjected on one side to chamber pressure and respective portions thereof on the opposite side being subjected to enclosure pressure and ambient atmospheric pressure, the interior of said cup-shaped valve member being subjected to fluid pressure through said valve port; a passage adapted to connect the chamber with ambient atmosphere; a pilot valve controlling said passage; differential pressure responsive means for controlling said pilot valve, one side of said pressure responsive means being adapted to be subjected to ambient atmospheric pressure and the other side thereof being adapted to be subjected to enclosure pressure, said pressure responsive means being so calibrated as to open the pilot valve when the differential of pressure between that in the enclosure and ambient atmosphere exceeds a predetermined value; and yielding means urging the valve member in the closing direction.

3. In a device for controlling the pressure within an enclosure having a connection with atmosphere; movable pressure sensitive control means, including a flexible element and a valve member operably connected with said element and adapted to control the flow of fluid through said connection; walls, including said element, defining a chamber having an inlet passage connecting said chamber with the enclosure; a passage adapted to connect the chamber with ambient atmosphere, said pressure sensitive control means being subjected on one side to chamber pressure and respective portions thereof on the opposite side being subjected to enclosure pressure and ambient atmospheric pressure; a pilot valve member controlling one of said passages; a bellows for controlling said pilot valve, one side of said bellows being adapted to be subjected to atmospheric pressure and the other side thereof being adapted to be subjected to enclosure pressure, said bellows having one end fixed and the other end movable, said pilot valve member being secured to the movable end of said bellows and extending interiorly of said bellows which is so calibrated as to move the pilot valve member in the opening direction when the differential of pressure between that in the enclosure and ambient atmosphere exceeds a predetermined value; yielding means urging the valve member in the closing direction, manually operable means for opening the pilot valve, said manually operable means being engageable with the movable end of said bellows for moving same and thereby moving the pilot valve member; and means for releasably latching said manually operable means in operative and inoperative positions respectively.

WALTER HERMAN WARSTLER.

References Cited in the file of this patent

UNITED STATES PATENTS

| Number | Name | Date |
|---|---|---|
| 2,208,554 | Price | July 16, 1940 |
| 2,224,394 | Jurs | Dec. 10, 1940 |
| 2,441,088 | Teague | May 4, 1948 |
| 2,450,881 | Cooper et al. | Oct. 12, 1948 |
| 2,461,415 | Dube | Feb. 8, 1949 |
| 2,463,487 | Widgery et al. | Mar. 1, 1949 |
| 2,477,005 | Paget | July 26, 1949 |
| 2,484,848 | Paget | Oct. 18, 1949 |
| 2,578,026 | Taylor | Dec. 11, 1951 |
| 2,590,330 | Krueger | Mar. 25, 1952 |